(12) United States Patent
Lookholder

(10) Patent No.: US 6,314,732 B1
(45) Date of Patent: Nov. 13, 2001

(54) HYDROGEN FUELED POWER PLANT SYSTEM

(76) Inventor: Theodore Lookholder, 1262 S. Barrington Ave., Los Angeles, CA (US) 90025

( * ) Notice: Subject to any disclaimer, the term of this patent is extended or adjusted under 35 U.S.C. 154(b) by 0 days.

(21) Appl. No.: 09/665,335

(22) Filed: Sep. 19, 2000

(51) Int. Cl.[7] .............................. F02G 1/00; F02B 51/00
(52) U.S. Cl. ............................................. 60/597; 123/536
(58) Field of Search ............................. 60/597; 123/536, 123/537

(56) References Cited

U.S. PATENT DOCUMENTS

| | | | |
|---|---|---|---|
| 3,311,097 | * | 3/1967 | Mittelstaedt . |
| 3,844,262 | * | 10/1974 | Dieges ............................. 123/1 A X |
| 3,946,711 | * | 3/1976 | Wigal ................................ 123/119 E |
| 3,983,882 | * | 10/1976 | Billings ................................ 123/1 A |
| 4,069,665 | * | 1/1978 | Bolasny ................................. 60/275 |
| 4,099,489 | * | 7/1978 | Bradley .................................... 123/3 |
| 4,111,160 | * | 9/1978 | Talenti ................................. 123/1 A |
| 4,308,844 | * | 1/1982 | Persinger ............................. 123/539 |
| 4,458,634 | * | 7/1984 | Carr et al. ................................ 123/3 |
| 4,599,865 | * | 7/1986 | Dalal ..................................... 60/673 |
| 5,293,857 | * | 3/1994 | Meyer ................................. 123/571 |
| 5,687,559 | * | 11/1997 | Sato ................................. 60/39.182 |
| 5,775,091 | * | 7/1998 | Bannister et al. .................. 60/39.05 |
| 5,809,768 | * | 9/1998 | Uematsu et al. .................. 60/39.465 |
| 5,941,219 | * | 8/1999 | Takebe ................................. 123/536 |

* cited by examiner

Primary Examiner—Hoang Nguyen
(74) Attorney, Agent, or Firm—James E. Brunton

(57) ABSTRACT

A hydrogen-ozone fueled power plant system that can be used for a variety of purposes including vehicles such as automobiles and trucks. The system includes a master generator for producing hydrogen and oxygen from water, another generator for producing ozone using the oxygen produced from the master generator and apparatus for supplying the hydrogen and ozone to the combustion chamber of an internal combustion engine. The steam produced during the combustion cycle is uniquely condensed into water that is returned to the fuel storage tank component of the system that supplies water to the master generator.

20 Claims, 2 Drawing Sheets

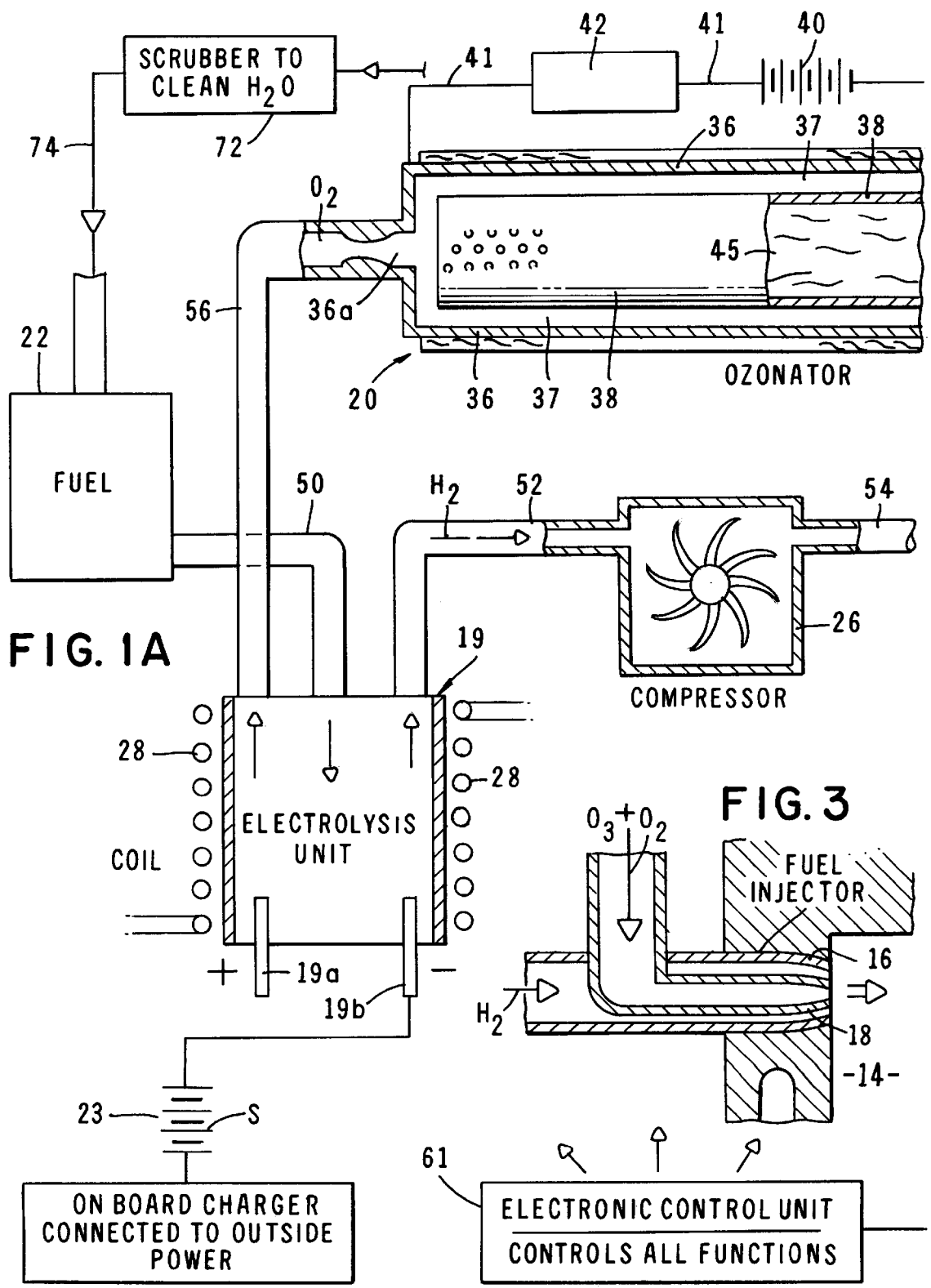

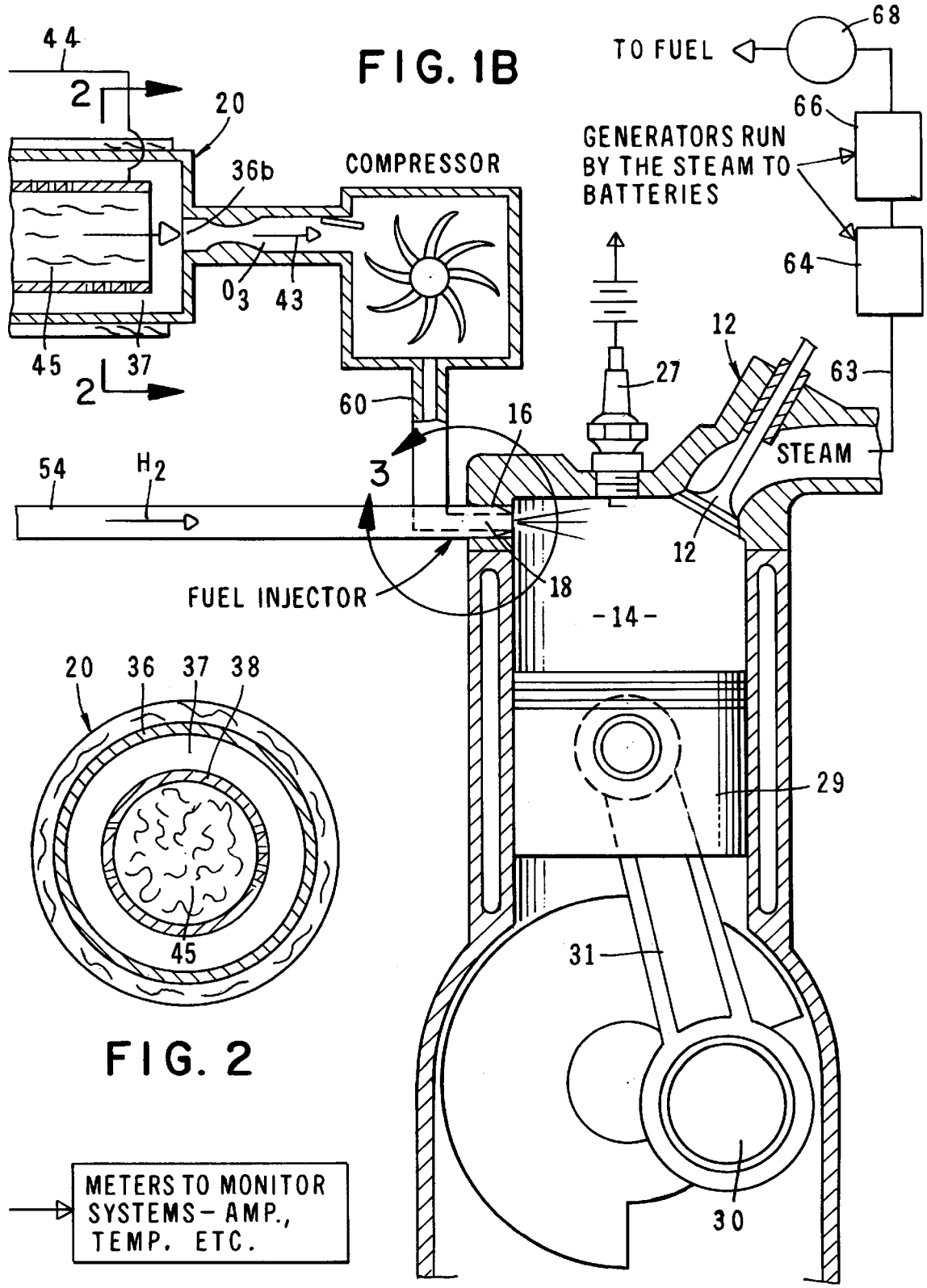

HYDROGEN FUELED POWER PLANT SYSTEM

BACKGROUND OF THE INVENTION

1. Field of the Invention

The present invention relates generally to internal combustion engines. More particularly, the invention concerns an internal combustion engine that is fueled by a mixture of hydrogen and ozone.

2. Discussion of the Prior Art

The great majority of internal combustion engines in present use are fueled by hydrocarbon fossil fuel that exhausts hydrocarbons, nitric oxides, carbon dioxide and carbon monoxide. As a result of the high levels of pollution in the atmosphere from current engines, the U.S. Government has set new emission standards for automotive vehicle engines, which require a considerable reduction in pollutants over the next several years.

Because of the pollution problems caused by conventional internal combustion engines, electric battery driven and various other engines have been suggested for powering automotive vehicles. However, the gasoline powered internal combustion engine has retained widespread usage in automobiles and trucks because of its ability to operate over a wide range of power demands and speeds and its ability to be relatively inexpensively manufactured.

The present invention contemplates using the basic conventional internal combustion engine design because of its reliability and other proven qualities. However, rather then using fossil fuels, the power plant system of the present invention is adapted to use hydrogen as a fuel both for the purpose of reducing harmful exhaust emissions and also for providing a more efficient engine. The hydrogen fueled power plant system of the invention as disclosed herein can be used in connection with vehicles, but also can be used for power plant purposes other than powering a vehicle.

In contrast to hydrocarbon fueled internal combustion engines, the hydrogen-ozone fueled power plant system of the present invention will emit virtually no pollutants with the virtual elimination of carbon monoxide and hydrocarbons. Further, due to the unique design of the power plant system of the invention, the steam produced during the combustion cycle is condensed and then recycled through a closed system for reuse in producing the hydrogen-ozone fuel used to power the internal combustion engine component of the system.

The use of hydrogen and oxygen as a fuel for internal combustion engines is discussed in U.S. Pat. No. 3,311,097 issued to Mittelstaedt. As disclosed in the Mittelstaedt patent, liberated hydrogen and oxygen gases are introduced into the combustion zone of the engine as a fuel where the gases are introduced into the intake line of the engine to combine with the intake air or fuel or mixture thereof to enrich and improve the charge to promote combustion to produce less toxic combustion products, to increase power, to increase the efficiency of the engine, and/or to economize on fuel.

U.S. Pat. No. 5,775,091 issued to Bannister et al discloses a power plant that combusts hydrogen with oxygen in a high pressure combustor to produce steam. The produced steam is mixed with cooling steam before being sent to a high pressure expander which expands the steam and generates rotating shaft power. The expanded steam is mixed with steam from the combustion of the hydrogen and oxygen in an intermediate pressure combustor and is expanded in an intermediate pressure turbine, thus creating more rotating shaft power. The steam from the intermediate pressure turbine is fed into a heat recovery steam generator that cools the steam and heats water streams to form cooling steam for at least one of the turbines and combustors. The now cooled steam exits the steam generator and passes through a low pressure turbine thereby generating more rotating shaft power and is condensed into water streams for heating into cooling steam in the steam generator.

U.S. Pat. No. 3,844,262 issued to Dieges discloses an open-cycle, internal combustion engine that uses in combination oxygen and hydrogen burned as fuel in the combustion chamber of the engine. In the Dieges apparatus, the oxygen and hydrogen is mixed with a surplus gas and comprises a substantially closed system which circulates the surplus gas through the system for reuse and expels only the water of combustion to the atmosphere.

U.S. Pat. No. 4,599,865 Dalal relates to a method and apparatus for a combustion of hydrogen to produce heat for generating steam for power generation. The Dalal apparatus includes two electrolytic cells which generate hydrogen and oxygen by electrolysis of acidulated water.

U.S. Pat. No. 5,782,081 issued to Pak et al discloses a hydrogen-oxygen burning turbine plant which comprises a closed loop turbine cycle including a compressor, a hydrogen/oxygen combustor and a turbine.

U.S. Pat. No. 4,308,844 issued to Persinger discloses a method and apparatus for improving the efficiency of an internal combustion engine by producing ozone gas and positively charged air particles in a supply of air to an engine. The apparatus comprises an ozone generator cell suitably position with respect to the engine so that an air supply to the engine passes between adjacent tubes of the ozone generator.

Unlike the prior art devices of the character discussed in the preceding paragraphs, the apparatus of the present invention uniquely captures the steam generated during the combustion of the hydrogen and ozone fuel, condenses the steam to produce water which is scrubbed and returned to the fuel tank in a closed system.

SUMMARY OF THE INVENTION

It is an object of the present invention to provide a novel, hydrogen-ozone fueled power plant system that can be used for a variety of purposes including vehicles such as automobiles and trucks.

More particularly, it is an object of the invention to provide a power plant system of the aforementioned character that includes a master generator for producing hydrogen and oxygen from water, another generator for producing ozone using the oxygen produced from the master generator and means for supplying the hydrogen and ozone to the combustion chamber of an internal combustion engine.

Another object of the invention is to provide a power plant system as described in the preceding paragraphs in which the steam produced during the combustion cycle is condensed into water that is returned to the fuel storage tank component of the system that supplies water to the master generator.

Another object of the invention is to provide a power plant system of the character described that is highly efficient in operation, is of a simple construction and is virtually pollution free.

Another object of the invention is to provide a hydrogen fueled power plant system that is both economical and reliable in operation.

BRIEF DESCRIPTION OF THE DRAWINGS

FIGS. 1A and 1B when considered together illustrate one form of the hydrogen fueled power plant system of the present invention.

FIG. 2 is a greatly enlarged, cross-sectional view taken along lines 2—2 of FIG. 1B.

FIG. 3 is a greatly enlarged, cross-sectional view of the area designated in FIG. 1B as 3.

DESCRIPTION OF THE INVENTION

Referring to the drawings and particularly to FIGS. 1A, 1B and 2, one form of the hydrogen fueled power plant system of the present invention is there illustrated. In this form of the invention, the system comprises a conventional internal combustion engine 12, which includes a combustion chamber 14. Operably interconnected with combustion chamber 14 is a first injection means for controllably injecting ozone into the combustion chamber. Operably associated with the first injection means is a first generator means for generating ozone and for supplying the ozone to the first injection means where it is then metered controllably into chamber 14 of engine 12. While only one cylinder of the engine 12 is shown in the drawings, it is to be understood that the engine can comprise a plurality of cooperating cylinders each having the general configuration shown in FIG. 1B.

A second injection means is also operably associated with the first injection means and with the combustion chamber 14 of the engine in the manner depicted in FIG. 1B. More particularly, as can be seen by also referring to FIG. 3, this second injection means comprises a hollow injection nozzle 16 within which the injection nozzle 18 of the first injection means is disposed. The details of construction and operation of the first and second injection means will presently be described.

As indicated in FIGS. 1A and 1B, a second generator means is operably associated with the second injection means of the invention and functions to generate the hydrogen gas that is supplied to the second injection means for combustion in chamber 14. This novel second generator means of the invention here comprises an electrolysis unit generally designated in FIG. 1A by the numeral 19. However, it is to be understood that the second generator means of the invention can comprise any electrolytic device that decomposes water to liberate hydrogen and oxygen gases at its electrodes. As indicated in FIG. 1A, not only does the second generator means, or electrolysis unit 19, produce hydrogen for supplying the second injector means, but the device also produces oxygen that is supplied to the first generator means which is here provided as a conventional ozonator 20.

Operably associated with electrolysis unit 19 is a fuel supply means or fuel tank 22 which contains the fuel, in this case water, that is supplied to the electrolysis unit for processing to produce hydrogen and oxygen. Power is supplied to electrolysis unit 19 by means of a power source generally designated in FIG. 1B by the letter "S". In this instance, the power source comprises a conventional storage battery 23 and includes a conventional, readily commercially available onboard charger for periodically charging the battery. The charger can be suitably interconnected with a source of outside power that supplies power to the charger in a manner well understood by those skilled in the art.

Comprising a part of the first injection means of the invention for supplying ozone to the first injector nozzle 18 is a conventional compressor 24. Compressor 24 is interconnected with ozonator 20 in the manner best seen in FIG. 1B and functions to receive ozone ($O_3$) from the ozonator, pressurize it and then to supply the ozone, under pressure, to first injector nozzle 18.

In similar manner, a second compressor 26, which forms a part of the second injection means of the invention, functions to supply hydrogen gas generated by the second generator means to combustion chamber 14 via second injector nozzle 16. Compressor 26 receives hydrogen from the electrolysis unit 19, in the manner shown in the drawings, pressurizes it then and supplies it to the second injector 16 for controlled injection into combustion chamber 14 of engine 12. Both compressor 24 and 26 are of a character well known to those skilled in the art and are readily commercially available from several sources including Bearing Engineers, Inc. of Aliso Viejo, Calif. and Numatic Engineering of Sun Valley, Calif.

In the apparatus of the present invention, the hydrogen generated by the electrolysis unit 19 is used as a fuel and the oxygen generated is used as an oxidizing agent.

It is, of course, well known that a mixture having a hydrogen fuel component in correct proportion with the oxygen component will explode violently when the mixture is ignited by a spark such as that generated by a conventional spark plug 27 (FIG. 1B). It is this controlled explosion that drives the piston 29 downwardly within the engine cylinder and, in turn, drives the engine crankshaft 30 via a piston rod 31 in a manner well understood by those skilled in the art.

While a number of different types of electrolysis units can be used in the system of the present invention, an electrolysis unit manufactured and sold by the Electrolyzer Corporation, Ltd. of Toronto, Canada is a suitable candidate. More particularly, an electrolysis unit sold by this company, which comprises a plurality of Stewart cells, is well suited for use in the system of the present invention. The Stewart cell is of the modem uni-polar type with each cell containing single plurality electrodes. Hydrogen is generated at the cathodes and oxygen at the anodes. Since electrodes of like plurality are connected in parallel, the operating voltage is maintained at the low level of on the order of 1.9 volts DC. Each electrode of the Stewart cell provides a large active surface for electrolysis in a minimum of space, thereby enabling the cell to absorb high total current and yet operate at low current density with a minimum generation of heat. Electrodes are constructed from special grades of nickel-plated, high-conductivity steel. Hydrogen and oxygen are collected in separate compartments and mixing is prevented by woven asbestos diaphragms. Water headers provide cooling water for individual hydrogen and oxygen scrubbers on the gas outlets and a cooling jacket on the back of each cell. Water flow can be adjusted to maintain optimum temperature in each cell and the affluent water can be recirculated. The hydrogen purity as generated in the Stewart cell is on the order of 99.9% and oxygen purity is on the order of 99.7%. In the preferred form of the invention shown in FIG. 1A, the electrolysis chamber of the unit is circumscribed by an electric coil 28 that functions to heat the chamber and accelerate electrolysis within the unit.

The ozonator 20 of the apparatus of the invention is also of a conventional construction and a suitable ozonator for use in the present system is commercially available from various commercial sources, including Jetlight Company, Inc. of Irvine, Calif. An alternate type of ozonator, also suitable for use in the apparatus of the present invention is an ozonator of the general character described in U.S. Pat.

No. 4,308,844 issued to Persinger. The Persinger ozonator comprises a tubular ozone generator cell that can be powered, for example, by a standard 12 volt automobile battery. In the form of the invention shown in FIGS. 1A and 1B, the generator means comprises an ozone generator 20 that is similar in many respects to the Pesinger ozonator as described in U.S. Pat. No. 4,308,844. More particularly, the ozone generator 20 here comprises an outer cylindrical housing 36 having an inlet port 36a and an outlet port 36b (FIG. 1B). Disposed internally of, and separated from, cylindrical housing 36 by an air gap 37 (FIG. 1A) is a second cylindrical housing 38. One terminal of a conventional battery 40 is interconnected with housing 36 via a suitable electrical connector 41 and a conventional transformer 42 in the manner illustrated in FIG. 1A. Transformer 42 is of a conventional construction and a transformer if the general character manufactured by Fire Wall Products Corporation of North Ridge, Calif. is suitable for use in the present application. In similar manner, the other pole of battery 40 is interconnected with inner housing 38 by means of a suitable electrical connector 44 in the manner shown in FIG. 1B.

In the form of the invention shown in the drawings, inner housing 38 is substantially filled with a metallic wool filling material 45 such as a copper, gold or platinum wool filling material which functions to improve the efficiency of the conventional ozonator. However, it is to be understood that such filling material is not necessary to the satisfactory operation of the ozonator and can be eliminated for certain end applications. It is also to be noted that in the present form of the invention, the inner cylindrical housing 38 is provided with a multiplicity of perforations so that the oxygen entering the ozonator via inlet port 36A will flow around, about and through the inner cylindrical housing 38 and will then flow outwardly of the unit via outlet port 36b (FIG. 1B).

During operation of the ozonator, inner cylindrical housing 38 functions as the charged plate and as the means for directing air through the ozonator cell. As in the conventional ozonator, the potential across air gap 37 adds positive charges to the oxygen introduced into the unit via inlet port 36A so as to produce the ozone gas which is directed toward compressor 24 in the manner indicated by the arrow 43 of FIG. 1B. It is to be understood that where required a plurality of ozone generators 20 can be coupled together to provide the desired quantity of ozone to compressor 24.

In operating the apparatus of the invention, fuel, in this case water, is supplied to the electrolysis unit 19 from tank 22 via conduit 50 (FIG. 1A). The electrolysis unit, which is heated by coil 28, includes an anode 19a and a cathode 19b which are, of course, interconnected with a source of electrical power "S" in the manner illustrated in FIG. 1A. When energized, the electrolysis unit 19 functions in a conventional manner to produce gaseous oxygen and hydrogen through the electrolysis process. The hydrogen gas flows from the electrolysis unit toward compressor 26 via conduit 52 and, after being pressurized, is supplied under pressure to injection nozzle 16 by means of a suitable conduit 54 (FIG. 1B).

In a similar manner, the oxygen gas generated by electrolysis unit 19 is supplied to the inlet port 36a of ozonator 20 by means of a conduit 56. The ozone gas which is generated by the ozonator 20 is first supplied to compressor 24 via a conduit 58 and then the pressurized ozone gas is then supplied to injector 18 via a supply conduit 60 (FIG. 1B).

As indicated in the drawings, the electronic control unit 61 of the apparatus controls all engine functions and includes a suitable fuel management system that is of a conventional construction well known to those skilled in the art. Control unit 61 is generally similar to those control systems used in connection with natural gas engines such as those manufactured by Deere Power Systems of Waterloo, Iowa. In fact, various components of the control unit, including the fuel management system, can be obtained from the Deere Power Systems Company. Detailed information concerning the control unit is contained in a Deere Power Systems' publication describing the company's Powertech 8.1 liter natural gas engine.

Among other things, control unit 61 controls the mixing of the hydrogen and ozone and controls the metering of the gaseous mixture to injectors 16 and 18 which injectors are also commercially available from sources such as Deere Power Systems.

Upon introduction into the combustion chamber 14 of the appropriately mixed and metered hydrogen and ozone gases by the injection means of the invention, which, of course, can take various forms well known to those skilled in the art, a spark generated by spark plug 27, which is also controlled by the control unit, will cause a controlled explosion within combustion chamber 14 driving piston 29 downwardly in a manner to impart rotation to the engine crankshaft in a conventional manner. Following the combustion cycle, exhaust valve 62 (FIG. 1B) will open in a conventional manner to permit the high temperature steam generated during the combustion cycle to be exhausted from chamber 14 into a steam conduit 63 and thence toward a pair of conventional steam turbine generators 64 and 66. Generators 64 and 66 are suitably interconnected with batteries 23 and 40 so as to continuously charge the batteries. The steam flowing from the turbine generators is then condensed in a conventional condenser unit 68 to produce water. The water thus produced is transferred to the fuel tank 22 via a conduit 70 and via a conventional scrubber unit 72 that is disposed between condenser 68 and fuel tank 22. Scrubber unit 72 is connected with fuel tank 22 by means of a suitable conduit 74. Condenser 68 and scrubber unit 72 are available from commercial sources such as Hayward Industrial Products, Inc. of Elizabeth, N.J.

The scrubbed fuel or water supplied to fuel tank 22 can then be controllably supplied to the electrolysis unit 19 to continue to fuel the engine with hydrogen and ozone in the manner described in the preceding paragraphs.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A power plant comprising:
   (a) a combustion chamber;
   (b) a first injection means operably associated with said combustion chamber for injecting gases into said combustion chamber;
   (c) a first generator means operably associated with said first injection means for generating ozone and for supplying said ozone to said first injection means;
   (d) a second injection means operably associated with said combustion chamber;
   (e) a second generator means operably associated with said first generator means and with said second injection means for generating oxygen and hydrogen and for supplying oxygen to said first generator means and for supplying hydrogen to said second injection means; and (f) fuel supply means operably associated with said second generator means for supplying fuel to said the generator means.

2. The power plant as defined in claim 1 in which said first generator means comprises an ozonator.

3. The power plant as defined in claim 1 in which said second generator means comprises an electrolytic cell.

4. The power plant as defined in claim 1 in which said second generator means comprises an electrolytic cell and heater means for heating said electrolytic cell.

5. The power plant as defined in claim 1 in which said combustion chamber includes an exhaust port in communication with said fuel means.

6. The power plant as defined in claim 1 in which said second injection means further includes a second injection nozzle in communication with said combustion chamber for introducing hydrogen into said combustion chamber.

7. The power plant as defined in claim 6 in which said first injection means further includes a first injection nozzle disposed interiorly of said second injection nozzle, said first injection nozzle being in communication with said combustion chamber.

8. A power plant comprising:

(a) a combustion chamber;

(b) a first injection means operably associated with said combustion chamber for injecting gases into said combustion chamber;

(c) a first generator means operably associated with said first injection means for generating ozone and for supplying said ozone to said first injection means, said first generator means comprising an ozonator;

(d) a second injection means operably associated with said combustion chamber;

(e) a second generator means operably associative with said first generator means and with said second injection means for generating oxygen and hydrogen and for supplying oxygen to said first generator means and for supplying hydrogen to said second injection means, said second generator means comprising an electrolytic cell; and (f) fuel means operably associated with said second generator means for supplying water to said second generator means.

9. The power plant as defined in claim 8 in which said first injector means includes a compressor.

10. The power plant as defined in claim 8 in which said second injector means includes a compressor.

11. The power plant as defined in claim 8 in which said second generator means further includes heater means for heating said electrolytic cell.

12. The power plant as defined in claim 8 in which said combustion chamber includes an exhaust port in communication with said fuel means.

13. The power plant as defined in claim 8 in which said second injection means further includes a second injection nozzle in communication with said combustion chamber for introducing hydrogen into said combustion chamber.

14. The power plant as defined in claim 13 in which said first injection means further includes a first injection nozzle disposed interiorly of said second injection nozzle, said first injection nozzle being in communication with said combustion chamber.

15. A power plant comprising:

(a) a combustion chamber having an exhaust port;

(b) a first injection means operably associated with said combustion chamber for injecting gases into said combustion chamber;

(c) a first generator means operably associated with said first injection means for generating ozone and for supplying said ozone to said first injection means, said first generator means comprising an ozonator;

(d) a second injection means comprising a second injector disposed exteriorly of said first injector and operably associated with said combustion chamber;

(e) a second generator means operably associated with said first generator means and with said second injection means for generating oxygen and hydrogen and for supplying oxygen to said first generator means and for supplying hydrogen to said second injection means, said second generator means comprising an electrolytic cell;

(f) fuel means operably associated with said second generator means for supplying water to said second generator means;

(g) a generator in communication with said exhaust port of said combustion chamber;

(h) a condenser in communication with said generator; and (i) a scrubber disposed between said condenser and said fuel means, said scrubber being in communication with said condenser.

16. The power plant as defined in claim 15 in which said first injector means includes a compressor.

17. The power plant as defined in claim 15 in which said second injector means includes a compressor.

18. The power plant as defined in claim 15 in which said second generator means further includes heater means for heating said electrolytic cell.

19. The power plant as defined in claim 15 in which said ozonator comprises:

(a) a generally cylindrically shaped first housing;

(b) a generally cylindrically shaped second housing disposed within said first housing; and (c) a metallic wool filling material disposed within said second housing.

20. The power plant as defined in claim 15 in which said ozonator further comprises a battery and a transformer connected to said first and second housing.

* * * * *